(12) United States Patent
Busaba et al.

(10) Patent No.: US 7,200,742 B2
(45) Date of Patent: Apr. 3, 2007

(54) SYSTEM AND METHOD FOR CREATING PRECISE EXCEPTIONS

(75) Inventors: Fadi Y. Busaba, Poughkeepsie, NY (US); Michael J. Mack, Round Rock, TX (US); John G. Rell, Jr., Saugerties, NY (US); Eric M. Schwarz, Gardiner, NY (US); Chung-Lung K. Shum, Wappingers Falls, NY (US); Timothy J. Slegel, Staatsburg, NY (US); Scott B. Swaney, Catskill, NY (US); Sheryll H. Veneracion, Pleasant Valley, NY (US)

(73) Assignee: International Business Machines Corporation, Armonk, NY (US)

( * ) Notice: Subject to any disclaimer, the term of this patent is extended or adjusted under 35 U.S.C. 154(b) by 235 days.

(21) Appl. No.: 11/055,193

(22) Filed: Feb. 10, 2005

(65) Prior Publication Data

US 2006/0179290 A1    Aug. 10, 2006

(51) Int. Cl.
*G06F 9/38* (2006.01)
(52) U.S. Cl. ...................... 712/244; 712/228
(58) Field of Classification Search ........... 710/260, 710/261, 262, 263, 264, 265, 266, 267, 268, 710/269; 712/228, 244
See application file for complete search history.

(56) References Cited

U.S. PATENT DOCUMENTS

| | | | |
|---|---|---|---|
| 5,075,844 A | 12/1991 | Jardine et al. | |
| 5,093,908 A | 3/1992 | Beacom et al. | |
| 5,537,538 A | 7/1996 | Bratt et al. | |
| 5,546,554 A | 8/1996 | Yung et al. | |
| 5,651,124 A | 7/1997 | Shen et al. | |
| 5,860,000 A | 1/1999 | Biswas et al. | |
| 5,875,346 A | 2/1999 | Luick | |
| 6,052,777 A | 4/2000 | Panwar | |
| 6,381,692 B1 | 4/2002 | Martin et al. | |
| 6,418,528 B1 | 7/2002 | Biswas et al. | |
| 6,542,988 B1 | 4/2003 | Tremblay et al. | |
| 6,658,550 B2 | 12/2003 | Martin et al. | |
| 6,807,628 B2 | 10/2004 | Homewood et al. | |
| 2002/0124163 A1 | 9/2002 | Homewood et al. | |
| 2002/0174323 A1 | 11/2002 | Biswas et al. | |
| 2004/0172522 A1 | 12/2004 | Ju | |
| 2004/0261068 A1 | 12/2004 | Ju | |

*Primary Examiner*—William M. Treat
(74) *Attorney, Agent, or Firm*—Cantor Colburn LLP

(57) ABSTRACT

A method for creating precise exceptions including checkpointing an exception causing instruction. The checkpointing results in a current checkpointed state. The current checkpointed state is locked. It is determined if any of a plurality of registers require restoration to the current checkpointed state. One or more of the registers are restored to the current checkpointed state in response to the results of the determining indicating that the one or more registers require the restoring. The execution unit is restarted at the exception handler or the next sequential instruction dependent on whether traps are enabled for the exception.

16 Claims, 2 Drawing Sheets

SYSTEM AND METHOD FOR CREATING PRECISE EXCEPTIONS

TRADEMARKS

IBM® is a registered trademark of International Business Machines Corporation, Armonk, N.Y., U.S.A. S/390, PowerPC, Z900 and z990 and other names used herein may be registered trademarks, trademarks or product names of International Business Machines Corporation or other companies.

BACKGROUND OF THE INVENTION

This invention relates generally to creating precise exceptions, and more particularly, to creating precise exceptions by use of a mini-refresh.

Most microprocessor architectures define that exception conditions must trap to software at a precise point in execution, usually immediately following the instruction that created the exception condition. A typical type of execution is a floating point underflow or overflow when the results exceed the bounding ranges of numbers. An example of an architecture is the PowerPC architecture. The PowerPC architecture defines four different modes of execution for floating point exceptions: ignore exceptions mode; imprecise non-recoverable mode; imprecise recoverable mode; and precise mode. Many programs are executed in an imprecise mode that allows instructions to be executed out of order. On exceptions, execution is halted at or after the instruction causing the exception. If execution is halted after the instruction causing the exception, then all state data is updated for every instruction in serial order up to the point where execution is halted, even if the execution is out of order. This mode is optimized by hardware design. The precise mode is usually implemented by not pipelining any floating point instructions which may result in execution times on the order of five to seven times slower than imprecise mode. It would be desirable to be able to improve the performance of the microprocessor when utilizing the precise mode of operation.

BRIEF SUMMARY OF THE INVENTION

Exemplary embodiments of the present invention include a method for creating precise exceptions. The method includes checkpointing an exception causing instruction. The checkpointing results in a current checkpointed state. The current checkpointed state is locked. It is determined if any of a plurality of registers require restoration to the current checkpointed state. One or more of the registers are restored to the current checkpointed state in response to the results of the determining indicating that the one or more registers require the restoring. Exception handling is performed in response to the exception. The execution unit is restarted.

Another exemplary embodiment includes a system for creating precise exceptions in an execution unit. The system includes a plurality of registers and a mechanism for checkpointing an exception causing instruction. The checkpointing results in a current checkpointed state. The current checkpointed state is locked. It is determined if any of a plurality of registers require restoration to the current checkpointed state. One or more of the registers are restored to the current checkpointed state in response to the results of the determining indicating that the one or more registers require the restoring. The execution unit is restarted at the exception handler or the next sequential instruction dependent on whether traps are enabled for the exception.

Additional features and advantages are realized through the techniques of the present invention. Other embodiments and aspects of the invention are described in detail herein and are considered a part of the claimed invention. For a better understanding of the invention with advantages and features, refer to the description and to the drawings.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

The detailed description explains the preferred embodiments of the invention, together with advantages and features, by way of example with reference to the drawings.

DETAILED DESCRIPTION OF THE PREFERRED EMBODIMENTS

Exemplary embodiments of the present invention include a method for creating precise exceptions on a microprocessor with limited out of order completion of instructions. Exemplary embodiments of the present invention are directed at improving the performance of precise mode to be closer to imprecise mode for the general non-exception cases and for an exceptional case to add an overhead to get the correct state. This is implemented by correcting the machine state back to what it should be after executing the instruction causing the exception. The execution unit (for example a floating point unit or a fixed point unit) is knowledgeable about execution within it, and can easily stop execution after the instruction causing the exception. This may be performed by blocking writes to the machine state such as the floating point register file (FPR) and/or the floating point status and control word (FPSCR) and stopping subsequent instructions in its pipeline. The problem with getting to the correct machine state is for out of order completion instructions. In a particular implementation of the PowerPC architecture, out of order completion is limited to floating point load instructions which may update FPRs and the FPSCR, and to fixed point instructions which may update general purpose registers (GPRs) and control registers (CRs or SPRs). Exemplary embodiments of the present invention provide a mechanism for recovering the original values of the FPRs, FPSCR, GPRs and CRs when an exception has occurred.

In most out of order completion microprocessors there is a mechanism for sequencing updates in a serial manner. In the PowerPC design considered, there is a completion buffer and the checkpointed state of the machine state in a recovery unit on the microprocessor. Exemplary embodiments of the present invention include a scheme for updating the local copy (also referred to herein as the shadow copy) of the machine state in each individual execution unit using the checkpointed state in the recovery unit. In addition, exemplary embodiments of the present invention may be utilized to implement two different re-order strategies for correcting shadow copies that have been updated past the operation causing an exception. The first approach is to update all the possible states that could have been corrupted. The second approach is to refresh only the state that has been corrupted by using a list of updates still to take place. These two approaches provide different levels of complexity and average latency of the recovery mechanism. By utilizing exemplary embodiments of the present invention, the execution unit can execute at full speed and later be corrected back to the point of the operation causing the exception.

Figure 1:
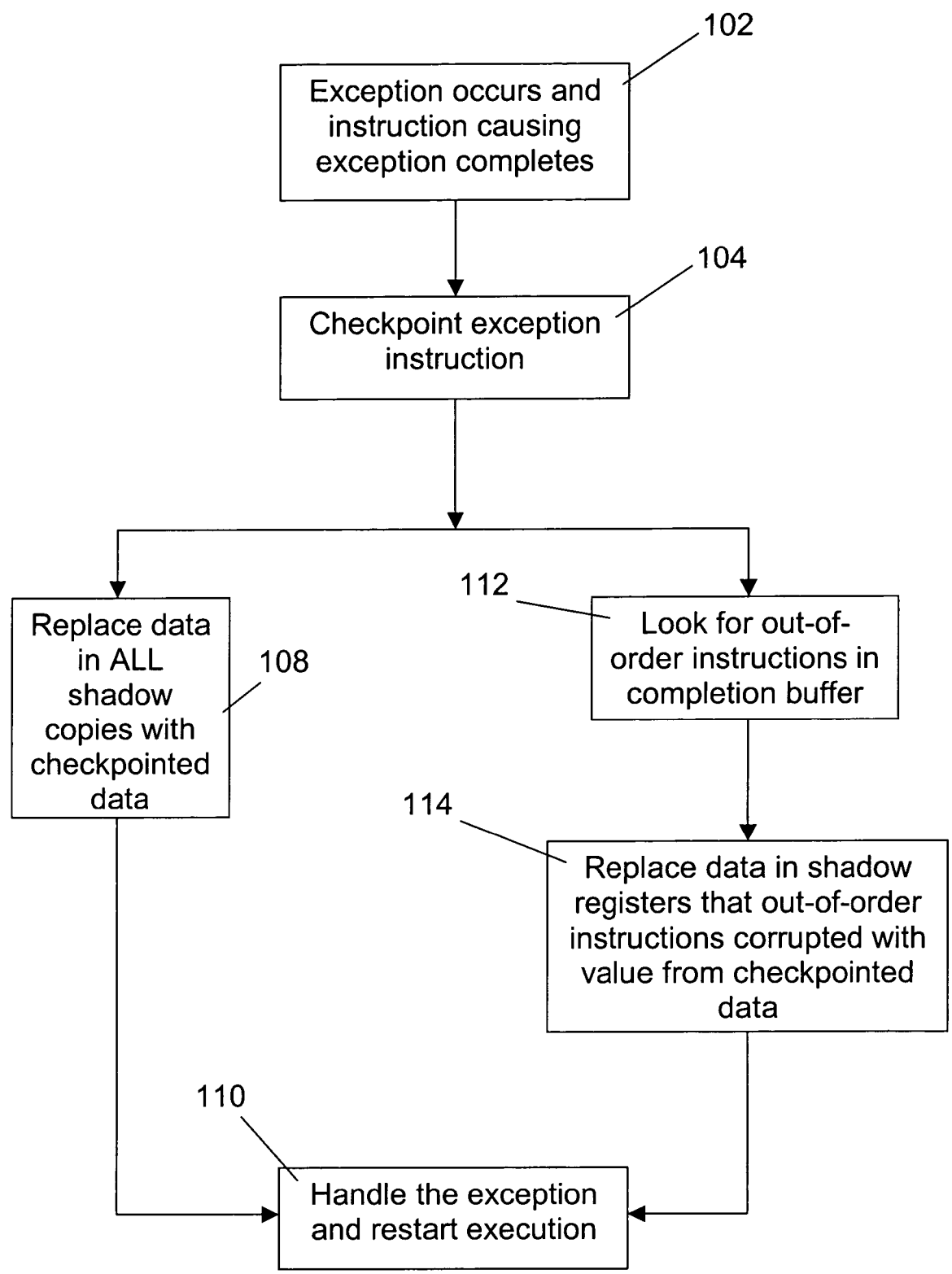
FIG. 1 illustrates an exemplary process flow that may be implemented by exemplary embodiments of the present invention to create precise exceptions.

FIG. 1 illustrates an exemplary process flow that may be implemented by exemplary embodiments of the present invention to create precise exceptions by restoring the entire machine state or via a selective recovery of portions of the machine state. At step 102, an exception occurs and the execution unit (e.g., a floating point unit) tags the completion of the instruction causing the exception, noting that is has caused an exception. When an instruction completes, the results of the instruction are written to a completion buffer that is utilized to serially order updates to the checkpointed state of the machine that is stored in a checkpointed state array. Next, at step 104, a checkpoint is performed for the instruction causing the exception when the recovery unit empties the instruction from the completion buffer into the checkpointed state array.

Next, step 108 is performed after step 104 if the approach being utilized is to update all the possible states that could have been corrupted by an out of order instruction being executed. At step 108, the data in the FPSCR (i.e, the shadow copy of the checkpointed state array located near the floating point unit) is replaced with checkpoint data from the checkpointed state array. In addition, all entries in the completion buffer subsequent to the instruction causing the exception are deleted. The recovery unit executes a recovery routine that involves reading out all the checkpointed state data from the recovery unit checkpointed state array. This data is written into all local or shadow copies (e.g., FPR, FPSCR, GPR and CR) of this state in the execution units. After completion of the recovery routine, processing continues at step 110 where the instruction dispatch unit handles the exception, for example, by invoking trap handler hardware and/or software to correct for the exception, by either notifying the programmer of the exception or by noting it and restarting execution at the current instruction address (e.g., the next instruction after the instruction causing the exception and the exception trap handler) which is part of the machine state. In this manner, any out of order instruction completions can be discarded by restoring all of the machine state after executing and committing the result of the instruction causing the exception.

Alternatively, step 112 is performed after step 104 if the approach being utilized is to update only the state that has been corrupted if any out of order instructions have been executed. At step 112, the completion buffer is examined for out of order instructions. If an out of order instruction is located in the completion buffer, then step 114 is performed and the data in the affected registers (e.g., FPR, FPSCR, GPRs and CRs) are updated with data values from the checkpointed state array. Note that the instruction causing the exception has been emptied from the completion buffer into the checkpointed state array in step 104, the completion buffer is examined to see which instructions may have updated the state incorrectly in step 112. For instance, in a machine which has limited out of order completion of only floating point loads and fixed point instructions, these types of instructions in the completion buffer would be examined.

If an instruction of this type is spotted, then it would cause the recovery unit to do a recovery of the particular register updated by this instruction. For instance, if a floating point load of FPR5 is in the completion buffer, the recovery unit would read FPR5 from the checkpointed state array and issue a write to the FPR array with an address of FPR5 using the checkpointed state.

In this manner, the time to refresh the state is very small, hence the name mini-refresh. Mini-refresh involves completing and checkpointing up to the instruction causing the exception, and refreshing the state of any out of order instructions in the completion buffer. Refreshing the state includes reading the checkpointed state and writing to any local, or shadow, copies of this state in the execution units; and then sending an instruction address to the instruction dispatch unit to resume execution at an address that corresponds to either the exception trap handler or to the next sequential instruction after the one causing the exception depending on the mode of trap. The restarting occurs at step 110 in FIG. 1.

Figure 2:
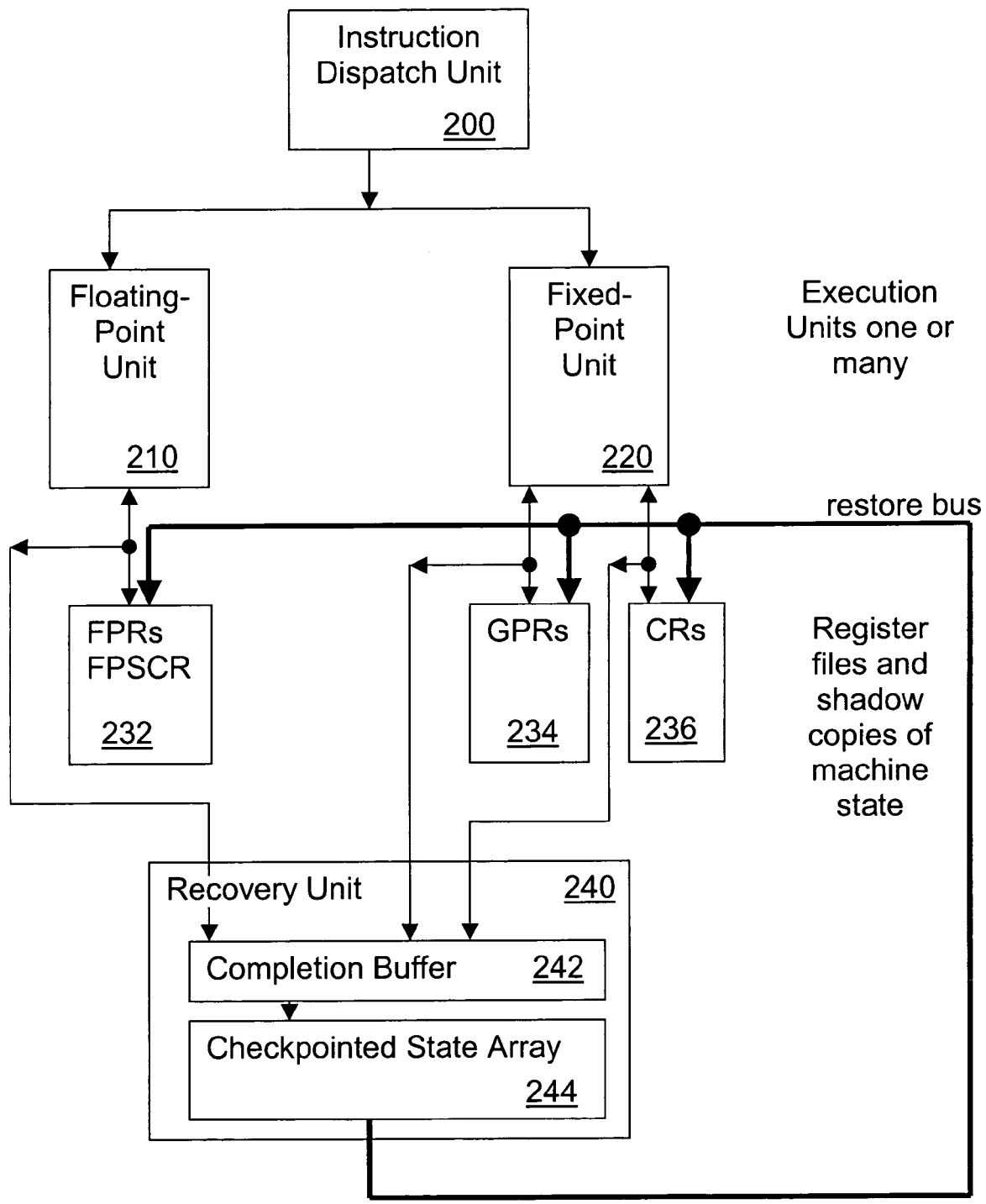
FIG. 2 illustrates an exemplary embodiment of a microprocessor with a recovery unit that can re-establish a checkpointed state for use in creating precise exceptions.

FIG. 2 illustrates an exemplary embodiment of a microprocessor with a recovery unit that can re-establish a checkpointed state for use in creating precise exceptions. The microprocessor includes an instruction dispatch unit 200 for sending instructions to a floating point unit 210 and/or to a fixed point unit 220. The dispatch unit 200 may send instructions to more than two execution units (e.g., floating point units 210 and fixed point units 220). The floating point unit 210 writes the results of an instruction from the dispatch unit 200 to the FPRs and/or FPSCR 232 (i.e., a shadow or local copy of the checkpointed state array 244) and to the completion buffer 242 within the recovery unit 240. The instruction results are written to the FPRs and/or FPSCR 232 in order of completion so that out of order instructions will write out of order to the FPRs and/or FPSCR 232. In contrast, the instruction results are written to the completion buffer 242 in the order that they were started so that out of order instructions will not be written to the completion buffer 242 in order of completion but instead will be written serially based on the order that the instructions entered the pipeline.

Similarly, the fixed point unit 220 writes the results of an instruction from the dispatch unit 200 to the GPRs 234 and/or CRs 236 (i.e., a shadow or local copy of the checkpointed state array 244) and to the completion buffer 242 within the recovery unit 240. The instruction results are written to the GPRs 234 and CRs 236 in order of completion so that out of order instructions will write out of order to the GPRs 234 and CRs 236. In contrast, the instruction results are written to the completion buffer 242 in the order that they were started so that out of order instructions will not be written to the completion buffer 242 in order of completion but instead will be written serially based on the order that the instructions entered the pipeline.

The completion buffer 242 is a staging area for updating the checkpointed state array 244. The number of entries in the completion buffer is equal to or larger than the number of cycles in the pipeline. This allows the completion buffer 242 to be utilized to determine if any out of order instructions were started in the pipeline after the instruction causing the exception started and finished before the instruction causing the exception finished.

By providing a mini-refresh capability, exemplary embodiments of the present invention allow partially out of order machines to maintain high speed execution while being able to achieve precise exceptions. Exemplary embodiments of the present invention allow execution units (e.g., floating point units and fixed point units) to execute at full speed and later be corrected back to the point in the operation causing the exception.

The capabilities of the present invention can be implemented in software, firmware, hardware or some combination thereof.

As one example, one or more aspects of the present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention, can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another.

The invention claimed is:

1. A method for creating precise exceptions in an execution unit, the method comprising:
   checkpointing an exception causing instruction, the checkpointing resulting in a current checkpointed state;
   locking the current checkpointed state;
   determining if any of a plurality of registers require restoration to the current checkpointed state;
   restoring one or more of the registers to the current checkpointed state in response to the determining indicating that the one or more registers require the restoring; and
   restarting the execution unit at the exception handler or the next sequential instruction dependent on whether traps are enabled for the exception.

2. The method of claim 1 wherein the execution unit is a floating point unit.

3. The method of claim 1 wherein the execution unit is a fixed point unit.

4. The method of claim 1 wherein the locking the current checkpointed state includes preventing one or more instructions that have not been checkpointed from being checkpointed.

5. The method of claim 1 wherein the performing the exception handling includes one or more of blocking an interrupt, disabling an instruction fetch, sending a hardware reset and invoking a trap handler.

6. The method of claim 1 wherein the determining indicates that the one or more registers require the restoring and the one or more registers include all of the plurality of registers.

7. The method of claim 1 wherein the determining indicates that the one or more registers require the restoring because the one or more registers have been updated by an out of order instruction.

8. The method of claim 1 wherein the results of the determining indicate that none of the plurality of registers require the restoring.

9. A system for creating precise exceptions in an execution unit, the system comprising:
   a plurality of registers; and
   a mechanism for:
      checkpointing an exception causing instruction, the checkpointing resulting in a current checkpointed state;
      locking the current checkpointed state;
         determining if any of the plurality of registers require restoration to the current checkpointed state;
      restoring one or more of the registers to the current checkpointed state in response to the determining indicating that the one or more registers require the restoring; and
      restarting the execution unit at the exception handler or the next sequential instruction dependent on whether traps are enabled for the exception.

10. The system of claim 9 wherein the execution unit is a floating point unit.

11. The system of claim 9 wherein the execution unit is a fixed point unit.

12. The system of claim 9 wherein the locking the current checkpointed state includes preventing one or more instructions that have not been checkpointed from being checkpointed.

13. The system of claim 9 wherein the performing the exception handling includes one or more of blocking an interrupt, disabling an instruction fetch, sending a hardware reset and invoking a trap handler.

14. The system of claim 9 wherein the determining indicates that the one or more registers require the restoring and the one or more registers include all of the plurality of registers.

15. The system of claim 9 wherein the determining indicates that the one or more registers require the restoring because the one or more registers have been updated by an out of order instruction.

16. The system of claim 9 wherein the results of the determining indicate that none of the plurality of registers require the restoring.

* * * * *